United States Patent [19]
Melchior

[11] 3,725,676
[45] Apr. 3, 1973

[54] ELECTRONIC AMPLIFIER CIRCUIT

[75] Inventor: Gérard Melchior, Paris, France

[73] Assignee: Compagnie Industrielle Des Telecommunications Cit-Alcatel, Paris, France

[22] Filed: July 27, 1971

[21] Appl. No.: 166,434

[30] Foreign Application Priority Data

July 27, 1970 France..........................7027652

[52] U.S. Cl. ..................307/255, 307/235, 307/296, 315/26

[51] Int. Cl..........................H03k 17/00, H01j 29/70

[58] Field of Search ......307/255, 235, 54, 70; 3/264, 3/296

[56] References Cited

UNITED STATES PATENTS 3,506,850 4/1970 Buck ..................................307/264

*Primary Examiner*—Herman Karl Saalbach
*Assistant Examiner*—B. P. Davis
*Attorney*—Craig, Antonelli & Hill

[57] ABSTRACT

An electronic amplifier circuit including a control transistor connecting a load to a low voltage source in response to a control signal below a prescribed level and control means for switching a high voltage source to said control transistor to energizing said load when the control signal exceeds the prescribed level.

11 Claims, 3 Drawing Figures

INVENTOR

GÉRARD MELCHIOR

BY Craig, Antonelli & Hill

ATTORNEYS

Figure 1:
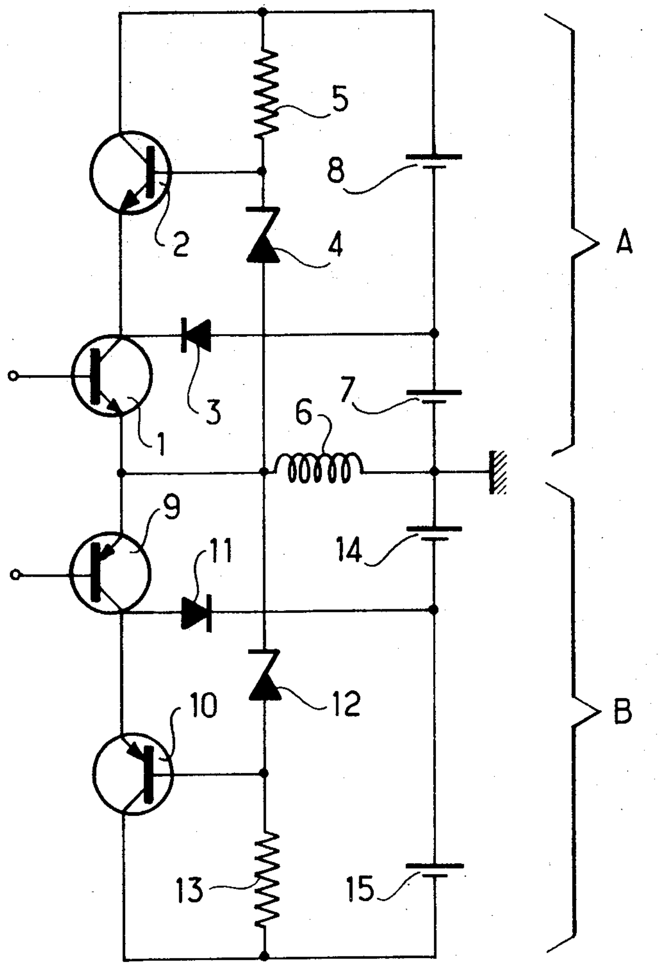

INVENTOR
GÉRARD MELCHIOR
BY Craig, Antonelli & Hill
ATTORNEYS

INVENTOR

GÉRARD MELCHIOR

BY Craig, Antonelli & Hill

ATTORNEYS

ELECTRONIC AMPLIFIER CIRCUIT

The present invention relates to an electronic amplifier circuit which is adapted to apply a voltage to a load; the voltage assuming exceptionally high values.

It is often necessary, particularly in sweep circuits controlling beam deflection in cathode ray tubes, to cause the voltage at the terminals of the load to vary within wide limits. This voltage which can have high values as soon as a fixed threshold has been exceeded, and this for brief periods of time, has low values outside of these periods. This voltage is, for example, that which is applied to the inductive load of deflection coils, which provide for the magnetic deflection of the electron beam in the cathode tube. It is necessary, particularly at the time of the positioning of the spot on the screen of the tube, to have available a high voltage for a very brief period of time.

A known amplifier circuit consists of two voltage sources, one with low voltage, the other with high voltage. The low-voltage source supplies the load through a control transistor every time it is operating outside of the periods during which the fixed threshold is not exceeded. The high-voltage source supplies the load through a balance transistor every time it is operating within the periods during which the threshold is exceeded. A supplementary device, for example of the flip-flop type, serves to render the control transistor or the balance transistor conductive in dependence upon the signal which this device receives, and indicates whether the control signal is on one side or on the other side of the threshold. It is quiet evident that this circuit can be made up of two branches so as to assure the considerable variations in voltage, which may be either positive or negative, depending upon the position of the spot on the screen.

This known amplifier circuit has the drawback that is permanently applies the high voltage to the terminals of the balance transistor and that, during the periods of conduction of the latter, it alone is subjected by the aforementioned flip-flop device to the strong current intensities flowing therethrough; moreover, it necessitates a supplementary control system.

In order to obviate these disadvantages, the present invention proposes an electronic amplifier circuit which is adapted to apply to a load a voltage which has for rare and brief periods of time values that are higher than a threshold yet lower than a specific maximum, and outside of these periods of time, they are lower than the aforementioned threshold. This circuit comprises a low-voltage source capable of furnishing a direct current voltage which is at least equal to the aforementioned threshold, this low-voltage source supplying the load in question through a control transistor receiving on the base thereof a control signal, a first electrode of this control transistor being connected to this low-voltage source, and a second electrode of this control transistor being connected to a terminal of the load. This circuit further comprises a high-voltage source capable of furnishing a direct current voltage that is at least equal to said maximum, means provided for supplying the load from the high-voltage source for these periods of time, and this circuit is characterized by virtue of the fact that these means comprise a balance transistor connected by means of its collector to the high-voltage source and by means of its emitter to this first electrode of the control transistor, and the base of this balance transistor, the sign of this potential difference being that which tends to render this balance transistor conductive through the control transistor.

Figure 2:
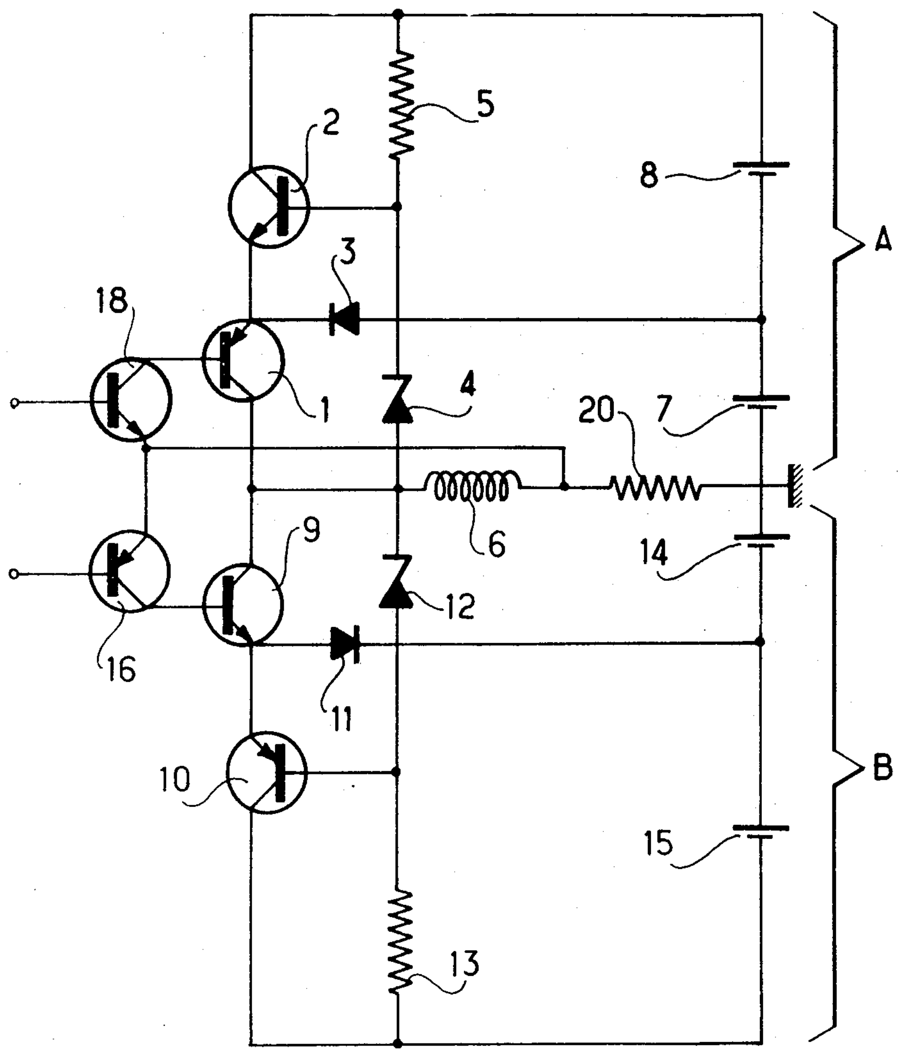
Figure 3:
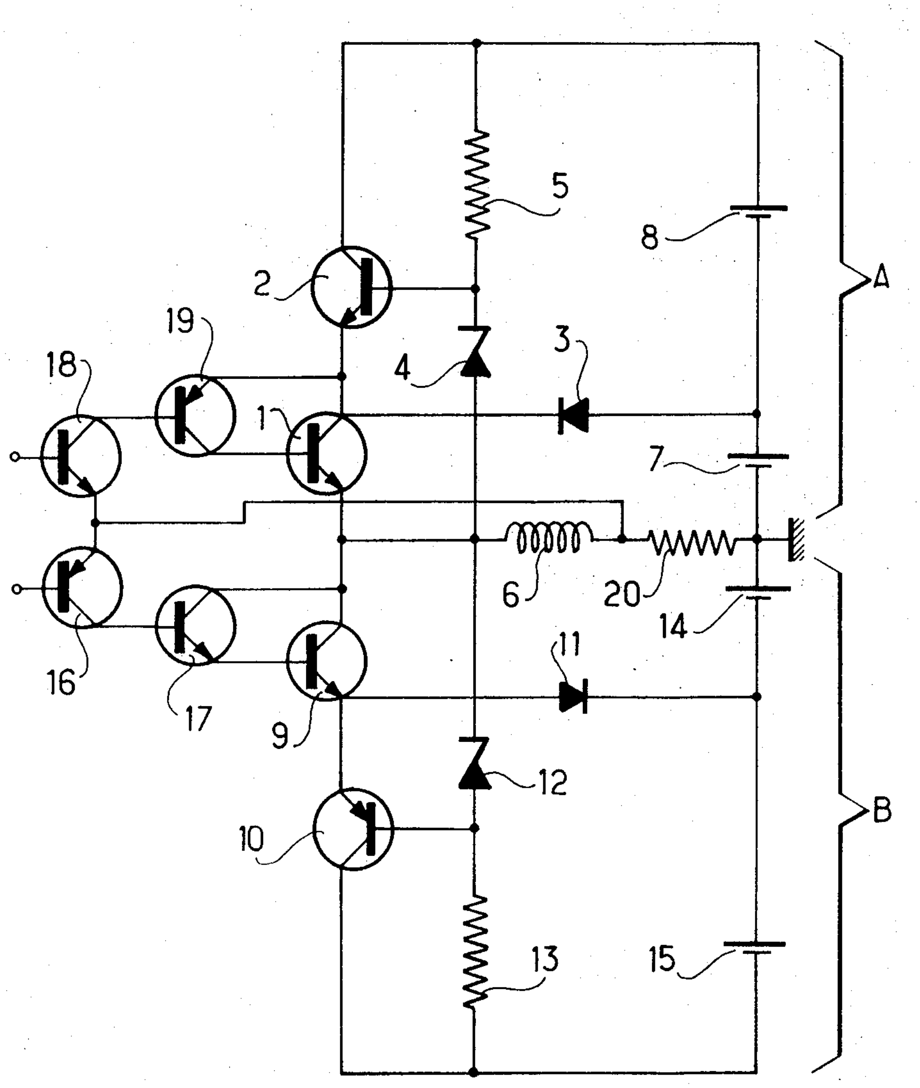

One embodiment according to the present invention will now be described hereinafter purely by way of example and without being limitative in any way, taken in connection with the accompanying schematic drawings which are to help facilitate understanding of the invention, in which like elements have been identified with the same reference numerals, and wherein:

FIG. 1 is a schematic circuit diagram of one embodiment of the present invention, FIG. 2 is a schematic diagram of the circuit with an impedance adapter amplifier in one of the branches thereof, and FIG. 3 is a schematic diagram of the circuit with an impedance adapter amplifier in each of the branches thereof.

FIG. 1 shows, by way of example, the two branches A and B of the device in accordance with the present invention, branch A allowing for strong positive voltage variations and branch B allowing for the strong negative voltage variations. These two branches have a symmetrical structure and symmetrical operation. Therefore, it suffices to describe only the operation of branch A to provide an understanding of the operation of branch B.

The control transistor 1, which is of the NPN type, receives on the base thereof the control signal for the voltage variation at the terminals of the coil 6 which is, for example, a coil serving for the magnetic deflection of the electron beam in a cathode ray tube. The coil 6 is connected to the emitter of the transistor 1 and to the negative pole of a low-voltage source 7. This source 7 supplies energizing voltage to the transistor 1 at the collector thereof by means of a rectifier 3. A second balance transistor 2 of the NPN type is connected by means of its emitter to the collector of the transistor 1 and the potential difference between the base of the transistor 2 and the emitter of transistor 1 is maintained constant by means of a Zener diode 4 and a resistor 5 connected between the base and the collector of the transistor 2. This transistor 2 is supplied with energizing voltage by a high-voltage source 8.

As long as the potential of the base of transistor 1 remains lower than a predetermined threshold, the coil 6 is supplied with energizing voltage from the low-voltage source 7. As soon as the base of the transistor 1 receives a signal with an amplitude greater than this threshold, the transistor 2 becomes conductive and the potential of the collector of transistor 1, and hence that of the cathode of the rectifier 3, is suddenly rendered greater than that of the anode thereof as a result of high-voltage source 8. The transistor 1 is then no longer supplied with energizing voltage by the source 7 through the rectifier 3 which ceases to be conductive. The transistor 2 whose emitter potential has been decreasing and whose base is correctly polarized by means of the Zener diode 4 thus becomes conductive when the emitter potential thereof falls below the base potential to switch in the source 8; and so the low-voltage source 7 as well as the high-voltage source 8 will energize the coil 6 through the transistors 1 and 2.

The branch B is symmetrical to the first branch A with respect to its structure and operation. The control transistor 9 is of the PNP type, as is the balance transistor 10.

The negative low-voltage source 14 and the negative high-voltage source 15 are equivalent to the positive sources 7 and 8; the rectifier 11, the Zener diode 12 and the resistor 13 are the same as elements 3, 4 and 5.

A somewhat more elaborate circuit is illustrated in FIG. 2. The operation of this circuit is identical with the operation of the circuit shown in FIG. 1. The positive branch A is slightly different since the control transistor 1 belongs to the PNP type, and its base is controlled by the collector of an NPN type input transistor 18. The emitter of the transistor 18 is connected to the junction point of the coil and of a resistor 20 disposed in series with the coil. This transistor receives on its base the control signal of the positive voltage variations. The negative branch B is slightly different from branch B shown in FIG. 1 since the control transistor 9 is of the NPN type. Its base is moreover controlled by the collector of an input transistor 16 of the NPN type. The emitter of the transistor 16 is connected to the junction point of the coil and of a resistor 20 disposed in series with the coil. This transistor receives on the base thereof the control signal of the negative voltage variations. This circuit which is somewhat more elaborate than that shown in FIG. 1 has the advantage of having a strong input impedance in each of the branches A and B. The transistors 16 and 18 are disposed as an amplifier adapter.

FIG. 3 illustrates a still more elaborate diagram of the circuit; it has the advantage of being provided on each of its branches A and B with an amplifier adapter, which further imparts to the device an increase in voltage.

As in FIG. 2, the control transistors 1 and 9 are both of the NPN type. In the positive branch A, the control transistor 1 is controlled at its base by the collector of an intermediate transistor 19 of the PNP type whose emitter is connected to the junction point of the coil 6 and a resistor 20. The input transistor 18 receives on the base thereof the control signal of the positive voltage variations.

In the negative branch B, the control transistor 9 is connected by means of the base thereof to the emitter of an intermediate transistor 17 of the NPN type whose collector is connected to the control transistor 9. The base of the intermediate transistor 17 is connected to the collector of a PNP type input transistor 16 whose emitter is connected to the junction point of the coil 6 and the resistor 20. The base of the transistor 16 receives the control signal of the negative voltage variations.

The resistor 20 in the devices which have been described in FIGS. 2 and 3 is a negative feedback resistor.

The advantage of a circuit of this type resides in that the control transistors belong to the PNP type, which assures a better band width in the device.

It is obvious that the three figures herein have been given only by way of example, and that each element herein could be exchanged for other elements assuring the same functions.

I claim:

1. An electronic amplifier circuit for supplying to a load a voltage having, for brief periods of time, values higher than a threshold but lower than a maximum, and having outside of these periods of time values lower than this threshold, comprising
   - a low voltage source capable of supplying a direct current at least equal to said threshold and a high voltage source in series with said low voltage source capable of supplying a direct current voltage at least equal to said maximum,
   - a control transistor receiving on the base thereof a control signal and having first and second electrodes, said load being connected between said first electrode and one side of said low voltage source,
   - a rectifier connecting said second electrode of said control transistor to the other side of said low voltage source with a polarity to conduct in the direction to energize said load through said control transistor, and
   - control means for connecting said load to said high voltage source during said brief periods of time including a balance transistor having a collector electrode connected to one side of said high voltage source and an emitter electrode connected to said second electrode of said control transistor, and impedance means for providing a constant potential difference between said first electrode of said control transistor and the base of said balance transistor, the sign of said potential difference being such as to render said balance transistor conductive through said control transistor.

2. An electronic amplifier circuit as defined in claim 1 wherein said first electrode of said control transistor is the emitter and the second electrode thereof is the collector.

3. An electronic amplifier circuit as defined in claim 1 wherein said impedance means includes a Zener diode connected between said first electrode of said control transistor and the base of said balance transistor and a resistor connected between the base and collector of said balance transistor.

4. An electronic amplifier circuit as defined in claim 1 wherein said first electrode of said control transistor is the collector and said second electrode is the emitter, and further including an input transistor having its collector connected to the base of said control transistor and its emitter connected to the side of said load which is connected to said low voltage source, said input transistor being of the PNP type and said control transistor being of the NPN type.

5. An electronic amplifier circuit as defined in claim 1 wherein said control transistor and said balance transistor are PNP transistors.

6. An electronic amplifier circuit as defined in claim 1, and further comprising
   - an additional low voltage source capable of supplying a direct current voltage at least equal to said threshold and an additional high voltage source capable of supplying a direct current voltage at least equal to said maximum,
   - a second control transistor receiving on the base thereof a control signal and having first and second electrodes, said load being connected between said first electrode and one side of said additional low voltage source, a second rectifier connecting said second electrode of said second control transistor to the other side of said additional low voltage source with a polarity to conduct in the direction to energize said load through said second control transistor, and additional control means for connecting said load to said additional high voltage source during said brief periods time including a second balance transistor having a collector electrode connected to one side of said additional high voltage source and an emitter electrode connected to said second electrode of said second control transistor, and additional impedance means for providing a constant potential difference between said first electrode of said second control transistor and the base of said second balance transistor, the sign of said potential difference being such as to render said second balance transistor conductive through said second control transistor.

7. An electronic amplifier circuit according to claim 6 wherein said first electrode of said control transistor is the collector of this transistor, said second electrode being the emitter of said control transistor, the base of this transistor being connected to the collector of an input transistor whose emitter is connected to the side of said load connected to said low voltage source, said input and balance transistors being of the NPN type and said control transistor being of the PNP type, said first electrode of said control transistor being the collector of this transistor, said second electrode then being the emitter of said second control transistor, the base of said second control transistor being connected to the collector of a second input transistor whose emitter is connected to the side of said load connected to said low voltage source, said second input and second balance transistors being of the PNP type, said second control transistor being of the NPN type.

8. An electronic amplifier circuit as defined in claim 7 wherein said impedance means includes a Zener diode connected between said first electrode of said control transistor and the base of said balance transistor and a resistor connected between the base and collector of said balance transistor, and wherein said additional impedance means includes a Zener diode connected between said first electrode of said second control transistor and the base of said second balance transistor and a resistor connected between the base and collector of said second balance transistor.

9. An electronic circuit as defined in claim 5, wherein the base of said control transistor is connected to the collector of an intermediate transistor whose emitter is connected to said second electrode of said control transistor, the base of said intermediate transistor being connected to the collector of an input transistor whose emitter is connected to the side of said load which is connected to said low voltage source.

10. An electronic amplifier circuit as defined in claim 9 wherein said intermediate transistor is of the NPN type and said input transistor is of the PNP type.

11. An electronic amplifier circuit as defined in claim 6 wherein the base of said control transistor is connected to the collector of an intermediate transistor whose emitter is connected to said second electrode of said control transistor, the base of said intermediate transistor being connected to the collector of an input transistor whose emitter is connected to the side of said load which is connected to said low voltage source, and wherein the base of said second control transistor is connected to the emitter of a second intermediate transistor whose collector is connected to said first electrode of said second control transistor, the base of said intermediate transistor being connected to the collector of a second input transistor whose emitter is connected to the side of said load which is connected to said additional low voltage source.

* * * * *